United States Patent

Thorpe

[15] 3,689,694

[45] Sept. 5, 1972

[54] SPECIAL EFFECTS GENERATOR

[72] Inventor: Laurence Joseph Thorpe, Burlington, N.J.

[73] Assignee: RCA Corporation

[22] Filed: May 6, 1971

[21] Appl. No.: 140,844

[52] U.S. Cl. ............................... 178/6.8, 178/DIG. 6

[51] Int. Cl. ............................................... H04n 5/22

[58] Field of Search ............ 178/6.8, DIG. 6, DIG. 35

[56] References Cited

UNITED STATES PATENTS

| | | | |
|---|---|---|---|
| 3,525,804 | 8/1970 | Owen | 178/DIG. 35 |
| 3,420,953 | 1/1969 | Wolff | 178/DIG. 35 |

*Primary Examiner*—Robert L. Griffin
*Assistant Examiner*—Richard K. Eckert, Jr.
*Attorney*—Eugene M. Whitacre

[57] ABSTRACT

One type of special effects generator for television systems permits one image to be superimposed over another, and to be movable so that the superimposed image may appear at any desired position on the raster of the reproduced composite image. When the superimposed image is moved so that it extends partly beyond one edge of the raster, the generator prevents that portion of the superimposed image which extends beyond the normal raster from appearing at the opposite edge thereof.

9 Claims, 6 Drawing Figures

PATENTED SEP 5 1972

3,689,694

INVENTOR.
Laurence J. Thorpe
BY
ATTORNEY

INVENTOR.
Laurence J. Thorpe
BY [signature]
ATTORNEY

INVENTOR.
Laurence J. Thorpe
BY
ATTORNEY

SPECIAL EFFECTS GENERATOR

This invention relates to special effects or pattern generating equipment for a television system and, more particularly, to special effects generators of the type for superimposing one video signal on another.

There are many different types of arrangements or patterns which can be generated by conventional special effects equipment for superimposing one image on another.

There are many different types of arrangements or patterns which can be generated by conventional special effects equipment for superimposing one image on another. Also associated with such equipment is apparatus for moving the pattern about the screen. Conventionally, this is accomplished by altering or moving the drive pulses with respect to the horizontal and vertical blanking pulses. The ability to move the pattern enables the user of such equipment to provide many desirable effects. For example, after such a pattern is being displayed, the operator may wish to move the pattern from the left to the right side of the screen to thereby either "wipe" the pattern off the screen, or to leave a desired portion of the pattern at this position. In such prior art devices, as the pattern is moved off one side of the picture, a portion of the pattern will again appear on the opposite side. This difficulty arises because of the positioning of the drive pulses in regard to the location of both the horizontal and vertical blanking pulses. In these devices, the switch pulse overlaps the blanking pulse and thereby causes "two" segmented patterns to appear.

These and other objects of the present invention are accomplished in a special effects generator by employing a phase shifting means which is responsive to the synchronizing pulses for providing phase shifted pulses therefrom. The phase shifted pulses are then conventionally applied to a pattern generating module associated with the special effects generator. Depending on the amount of phase shift of the pulse, the pattern is moved on a display accordingly. First means are responsive to the synchronizing signal prior to phase shifting the same to provide a first signal of a lower frequency than the synchronizing signal and of a phase in accordance with the phase of the synchronizing signal. The phase shifted signal is applied to second means which produces the same frequency as said first means but of a phase in accordance with the phase shifted signal. Coincidence means are then responsive to the first and second signals and to the phase displaced pattern signal obtained from the pattern generator to provide a new pattern signal whereby the switch pulses are provided in a manner to cause only a desired segment of a pattern to be displayed.

These and other objects of the invention will be described in greater detail if reference is made to the following specification when read in conjunction with the accompanying drawings, in which.

Figure 1A:
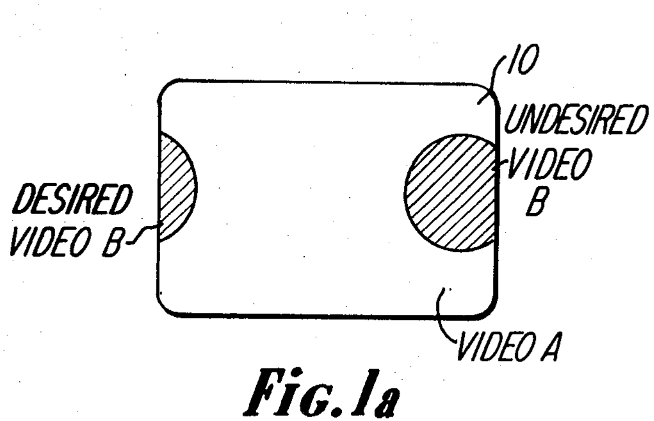
FIGS. 1a and 1b show a display produced by prior pattern generators showing a desired and an undesired pattern.

Referring to FIG. 1a, a display 10 which might be seen on a television receiver, depicts a typical special effects pattern. The pattern shown is conventionally referred to as an iris display. For examples of typical iris pattern generating circuitry, reference is made to a copending application Ser. No. 136,326 filed Apr. 22, 1971 entitled "SPECIAL EFFECTS GENERATORS FOR PROVIDING IRIS-TYPE TELEVISION DISPLAYS" by the same inventor as herein and assigned to the RCA Corporation.

As explained in that application, a special effects or pattern generator serves to simultaneously display two or more video signals. In the example shown, a first video signal designated as video B would be displayed within the separated parts of the circle and as represented by the hatched lines. Video A information is conventionally displayed over the remainder of the picture.

The operator of the special effects generator has the ability to position or move the circle containing the video B information about the screen. The positioning thus enables unique display representations for different programming requirements.

One problem with the prior pattern generators is shown in FIG. 1. For example, it may be desired to move the circle towards the left hand side of the screen to enable the presentation of both video signals while still providing some visual isolation. When the pattern is moved to far to the left as shown in FIG. 1a, the missing segment of the circle will reappear at the right hand side of the picture.

Figure 1B:
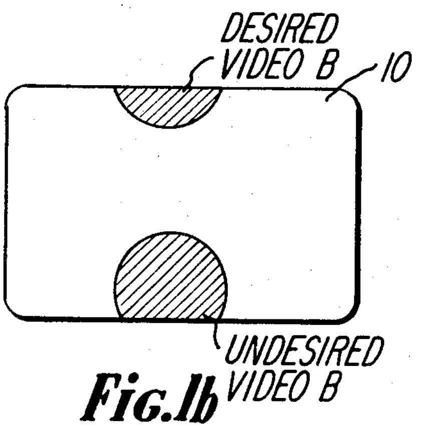

FIG. 1b shows a similar effect which occurs when the pattern is moved in the vertical direction. The reason for this will be explained with reference to FIGS. 2 and 3.

Figure 2:
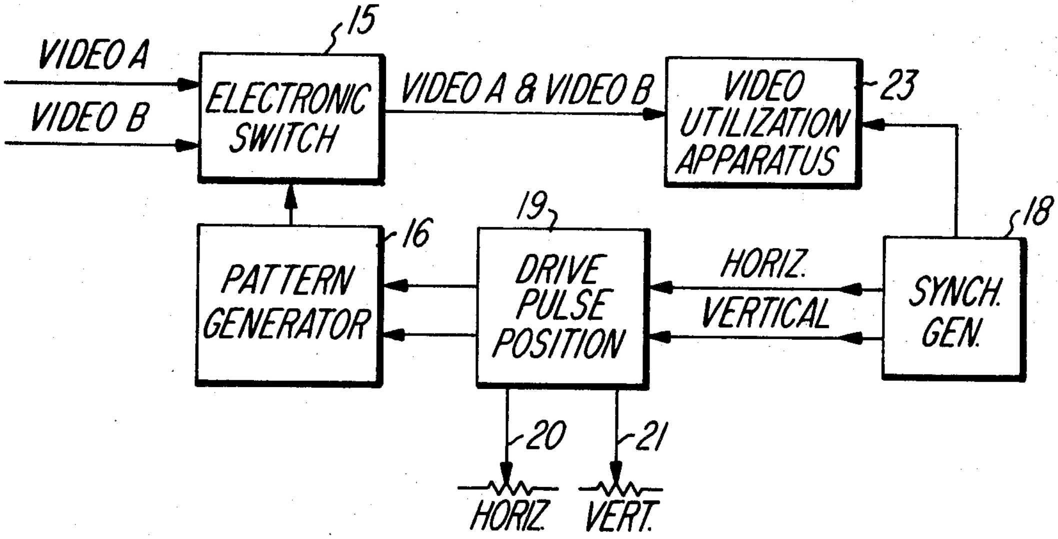
FIG. 2 is a block diagram of a prior special effects or pattern generator apparatus.

The block diagram of a typical special effects or pattern generator circuit is shown in FIG. 2 and basically comprises an electronic video switch 15 which may be a bistable multivibrator or some other suitable circuit operated by a multivibrator and capable of switching between a first and a second state. The switch 15 has a pair of input circuits to receive separate video signals designated respectively as video A and video B. Upon activation of the switch 15 from one state to another state, either the video A or the video B signal will be applied to the video utilization apparatus 23. The switching rate and sequence is controlled by means of a pattern generator 16 which operates in response to suitable drive pulses obtained from a sync generator 18 used, for example, to derive information necessary to develop horizontal and vertical deflection signals. Such signals are necessary to permit a television receiving apparatus to produce a stable raster. The sync generator 18, as is well known in the art, provides horizontal and vertical synchronizing pulses which are applied to a drive pulse positioner module 19. The function of the drive pulse positioner 19 is to enable a time delay of either the horizontal or vertical pulse, or both, to control the position of the pattern on the display. The timing of the horizontal and vertical drive pulses from the drive pulse positioner 19 are controlled respectively by the controls 20 and 21 designated as horizontal and vertical. The function of such controls 20 and 21 is to provide a predetermined time delay to either the horizontal or vertical drive pulses to enable the generation of the desired pattern, thus causing it to appear at a desired location on the television display. Thus the output signal from the electronic switch 15, which contains the generated video signal, consists of a video A signal and a video B signal switched according to predetermined pattern signals generated under the control of the pattern generator 16. If such an output signal were applied to a receiver or a video monitor generally designated as video utilization apparatus 23, the monitor could provide the displays as shown in FIGS. 1A and 1B. Since the apparatus 23 is synchronized by means of sync generator 18, the consequent positioning of controls 20 and 21 would permit movement of the pattern either in the vertical or the horizontal direction according to the setting of such controls. If one were to set the controls so that a desired video signal would appear as shown in FIG. 1, the undesired signal would also appear as shown in FIG. 1.

Before proceeding with an explanation of why this effect is present, it is noted that the same phenomena exists for both the horizontal and vertical and, therefore, it is adequate to describe the operation in regard to only one of these signals.

Figure 3:
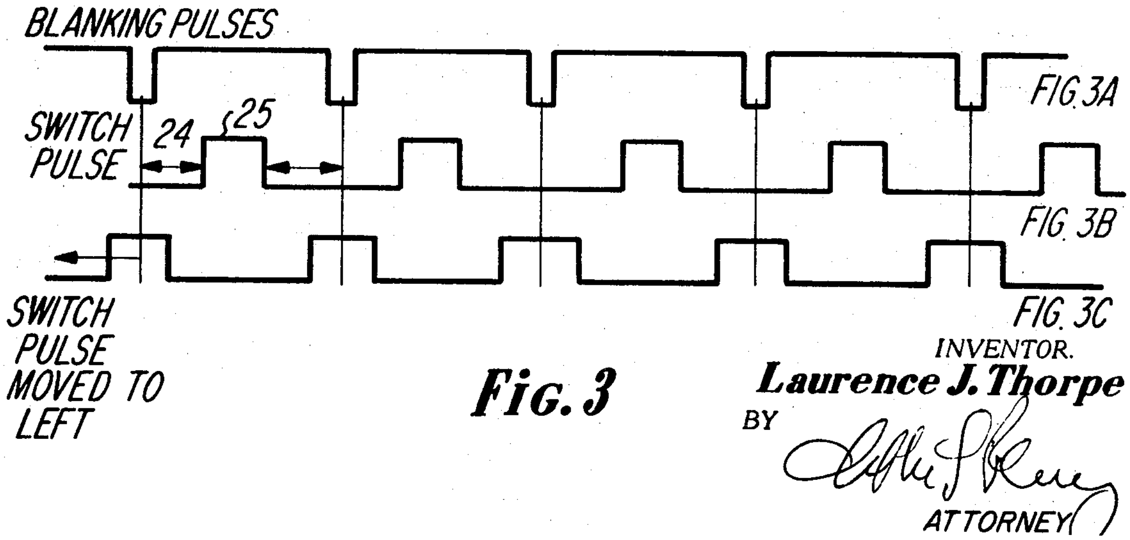
FIG. 3 is a series of timing diagrams necessary to explain the problem encountered in prior art pattern generators.

If reference is made to FIG. 3, consider the actual switching pulses emanating from the pattern generator 16 as they occur in relation to the input drive pulses applied to the drive pulse positioner 19. The discussion will be restricted to the horizontal pulses.

FIG. 3A shows typical horizontal blanking pulses from the sync generator 18 which are stationary and are used in the television system to blank the kinescope during the horizontal retrace period. The time between pulses represents the scanning time or duration of one television line.

FIG. 3B shows a typical series of switch pulses which, for example, would be available at the output of the pattern generator 16 to enable switching between the video A and video B signal. The diagrams attempt to show the switch pulses of FIG. 3B approximately in the center of the line, which would therefore indicate a centered pattern.

Briefly, the pattern is generated as follows. With the signals shown in FIG. 3B applied to the switching input of the electronic switch 15, the following results. During the start of the line and for the level 24 of the switching pulse, video A information is provided at the output of the electronic switch. As soon as the leading edge of the switch pulse occurs, the electronic switch 15 is actuated and causes video B information to be displayed for the duration or width of the switch pulse shown in FIG. 3B. As soon as the switch pulse terminates, the level 24 again will permit video A information to be displayed.

Due to the time duration between the leading edge of the switching pulse and the center of the blanking pulse and between the trailing edge of the switching pulse and the center of the next blanking pulse, it can be seen that the switching takes place approximately at about the center of the television line, which therefore means, as indicated above, that the pattern is essentially centered. The width of the switching pulse, as stated, is determinative of the width of the pattern in the horizontal duration, which would determine the diameter of the circle. In order to move this pattern either to the right or to the left, the switch pulse of FIG. 3B has to be moved with respect to the fixed blanking pulse. This is what is accomplished by the drive pulse positioner 19 of FIG. 2.

Referring to FIG. 3C, there is shown a series of switch pulses which will cause the pattern to appear at the left hand side of a display. As one can see from FIG. 3C, the center of the switch pulse is approximately aligned with the center of the blanking pulse. This means that the portion of the switch pulse, for example, to the right of the center line will produce a desired video pattern at the left of the screen. However, the portion of the switch to the left of the center line, since it is wider than the blanking pulse, will also produce a video pattern at the right of the screen. Therefore, prior pattern generators will provide the displays as shown in FIG. 1 in accordance with the timing relationships shown in FIG. 3. It is desirable to provide apparatus which will produce the requisite elimination of the undesired portion of the switching pulse and which will be preferably sensitive to the direction of the motion of the pattern.

Figures 4, 4A, 4B, 4C, 4D, 4E, 4F, 4G, 4H, 4I:
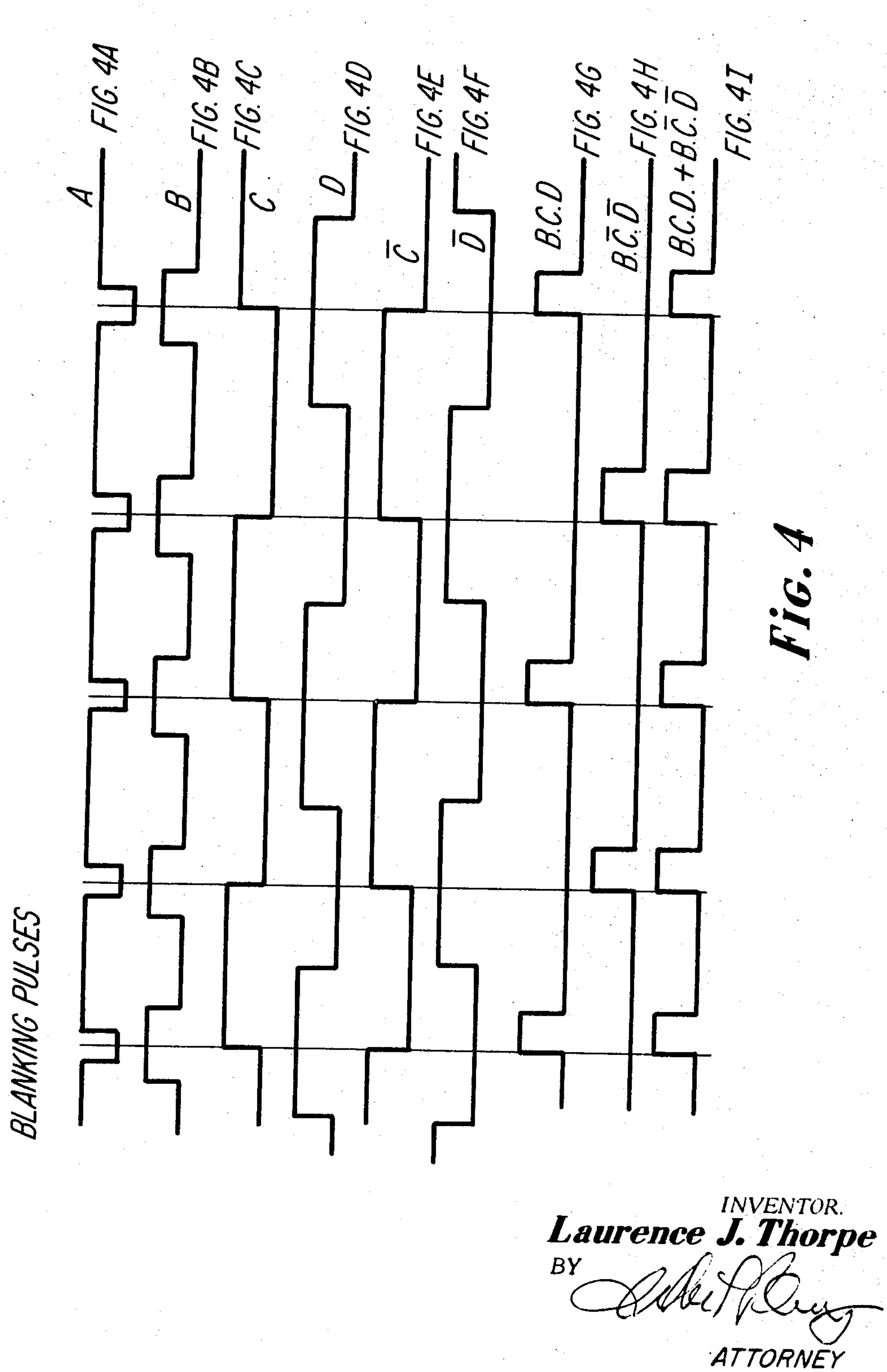
FIG. 4 is a series of timing diagrams useful in explaining the operation of the present invention.
Figure 5:
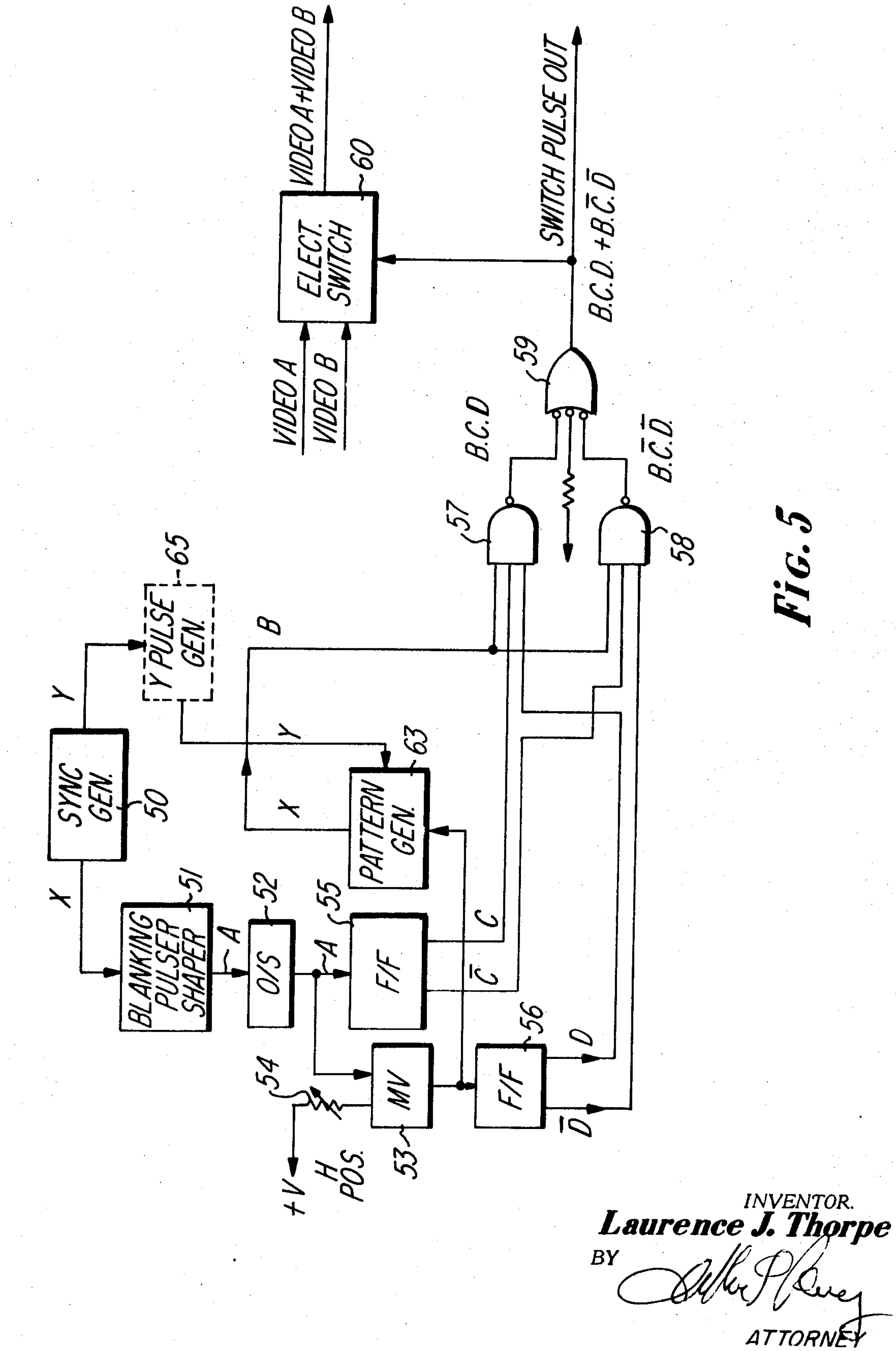
FIG. 5 is a schematic diagram partially in block form of an improved special effects or pattern generator embodying this invention.

FIG. 4 shows a series of timing waveforms which are generated by the apparatus shown in FIG. 5 to produce the requisite pattern blanking.

FIG. 4A represents the blanking pulses A as shown in FIG. 3A which provide the reference in time.

FIG. 4B shows the switching pulses B representative of the output from the pattern generator which would produce the pattern shown in FIG. 1 if they were applied to control an electronic switch. These pulses, for example, correspond to the pulse train shown in FIG. 3C and as necessary to obtain a pattern on the left hand side of a video display.

FIG. 4C shows a waveshape C which is synchronized to the blanking pulse having its leading and trailing edges occurring at the center of the blanking pulse.

FIG. 4D shows a waveshape D having the same repetition rate as the waveshape of FIG. 4C but which is synchronized with respect to the switching waveshape shown in FIG. 4B.

FIG. 4E represents the inverted waveshape $\overline{C}$ of FIG. 4C and FIG 4F represents the inverted waveshape $\overline{D}$ of FIG. 4D.

Referring to FIG. 4G, the waveshape B.C.D. thus shown is derived by applying the waveshape shown in FIGS. 4B, 4C and 4D to the input of an AND circuit which will provide an output only when the three waveshapes are in coincidence.

The waveshape B.$\overline{C}$.$\overline{D}$. in FIG. 4H is obtained by the application of the waveshapes shown in FIGS. 4B, 4E and 4F to the respective inputs of another AND gate.

The waveshape B.$\overline{C}$.$\overline{D}$. in FIG. 4I is the result of applying the waveshapes of FIG. 4G and 4H to the input of an OR gate. It can also be seen from the waveshape shown in FIG. 4I that this represents the desired switching pulse which will eliminate the undesired portion of the pattern as shown in FIG. 1, for example, while displaying the desired portion. It is also noted that the waveshapes of FIGS. 4B, 4D and 4F are moved or positioned in time sequence. Thus if the switching pulse were positioned to the right instead of the left, the undesired portion of the switch pulse would also be removed by the logic circuitry to be described.

In regard to horizontal blanking, the waveforms shown in FIGS. 4C and 4D are square waves at half the horizontal rate, waveform C being of fixed relative timing. Waveform D is also locked to the horizontal drive but is moved in time with the switching pulse of FIG. 4B by a horizontal positioner as will be explained.

FIG. 5 shows circuitry for generating the waveshapes described in FIG. 4. The sync generator 50 provides horizontal and vertical synchronizing pulses utilized by a receiver for generating a stable raster. The horizontal synchronizing pulse is applied to a shaping circuit 51. The output of the shaping circuit 51 contains the horizontal blanking pulses A as shown, for example, in FIG. 4A. These pulses are then applied to a monostable or one-shot multivibrator 52 to provide pulses, each of which has a leading edge occurring at the center of the horizontal blanking pulse. The output from the multivibrator 52 is applied to a voltage controlled multivibrator 53. Multivibrator 53 operates to provide a series of phase shifted pulses. The exact phase is under control of a timing network including variable resistor 54 coupled to a suitable input of the multivibrator and referenced as a horizontal positioner.

The operation of the multivibrator 53 is to delay the pulse train from multivibrator 52 by a selected amount. The output of multivibrator 53 is coupled to an input of the pattern generator 63 which is responsive to this shifted pulse to provide, for example, at its output the shifted switch pulses as shown in FIG. 4B. As indicated, the pattern generator 63 is responsive to both the horizontal and vertical pulses to develop at an output a series of switching pulses having amplitude and phase representative of a particular pattern to be displayed.

The output wave of the multivibrator 52, which is fixed in phase with respect to the blanking pulses, is also applied to the input of a bistable multivibrator 55. The multivibrator 55 operates to provide at its output the waveshapes shown in FIGS. 4C and 4E respectively which are also designated as C and $\overline{C}$. As indicated, these waveshapes occur at one-half the horizontal rate and are of fixed relative phase.

Similarly, the output of multivibrator 53 is applied to an input of a bistable multivibrator 56 which serves to provide the waveforms shown in FIGS. 4D and 4F labeled respectively as D and $\overline{D}$. These waveshapes, as indicated previously, are synchronized to the pulse emanating from multivibrator 53 and therefore move in synchronism with the phase shifted pulses available at the output of multivibrator 53.

A pair of AND gates 57 and 58 serve to provide at their outputs the waveforms shown in FIGS. 4G and 4H respectively. The outputs of these AND gates are applied to an OR gate 59 to provide the output shown in FIG. 4I. These output pulses, as indicated, are then utilized for application to the electronic switch 60 to provide at an output the composite signal consisting of video A and video B in a manner to produce the requisite pattern of information.

The nature of these pulses as explained in conjunction with FIG. 4 serves to eliminate the undesired pattern from appearing on the screen when a desired portion of the pattern extends beyond one extreme side of the display.

Although the above description was given in terms of the horizontal pulses, it can be seen that the same circuitry can be employed to generate pulses in the vertical direction by means of the module 65 basically described as a Y pulse generator. This generator would contain similar circuitry to afford the same types of waveform relationships for the vertical circuitry.

What is claimed is:

1. Video switching means for providing a series of switching pulses derived from regularly recurring synchronizing pulses, said series of pulses used for application to an electronic switch for controlling the switching rate thereof in response to said series of pulses to enable switching between at least two video signals, comprising:

a. means responsive to said synchronizing pulses for providing a series of pulses of wider duration than said synchronizing pulses, said series of pulses having the same repetition rate as said synchronizing pulses, b. first means responsive to said series of pulses for eliminating every other pulse in said series and every portion of said series pulse which extends beyond a predetermined position of said synchronizing pulse, c. second means responsive to said series of pulses for providing every pulse eliminated by said first means, and for eliminating every portion of said provided pulses which extend beyond a predetermined portion of said synchronizing pulse, d. third means coupled to said first and second means for adding said pulses provided thereby to provide a new series of pulses at said synchronizing repetition rate, each of said pulses in said new series having a duration which commences from said predetermined position of said synchronizing pulse to a second position in a given direction from said predetermined position, e. fourth means coupling said third means to said electronic switch for controlling the switching thereof.

2. In a special effects generator of the type for providing a pattern signal for displaying at least two video signals in a predetermined pattern, said generator operating on synchronizing signals utilized in a television system for producing a raster on a receiver display generated in two mutually perpendicular directions, in combination therewith apparatus for moving said displayed pattern on said receiver display and preventing segments of said pattern from simultaneously appearing at opposite edges of said display, comprising:

a. phase shifting means responsive to at least one of said synchronizing signals for providing a phase shifted synchronizing signal, b. means coupling said phase shifted signal to said generator for providing a phase displacement pattern signal in response to said phase shifted signal, c. first means responsive to said synchronizing signals for providing a first signal of a different frequency and of a phase in accordance with the phase of said synchronizing signal, d. second means responsive to said phase shifted synchronizing signal to provide a second signal of the same frequency as said first but of a phase in accordance with said phase shifted signal, e. coincidence means responsive to said first and second signals and said phase displaced pattern signal to provide a new pattern signal whereby any phase shifting of said synchronizing signals by said phase shifting means is controlled to cause only said desired segment to be displayed.

3. The special effects generator according to claim 1 wherein:

said first means comprises a bistable multivibrator having an input terminal responsive to said synchronizing pulses to provide at an output a signal of one-half the frequency of said pulses.

4. The special effect generator according to claim 1 wherein:

said second means comprises a bistable multivibrator having an input terminal responsive to said phase shifted synchronizing signals to provide at an output terminal a signal of one-half the frequency of said phase shifted pulses.

5. The special effects generator according to claim 1 wherein:

said at least one synchronizing signal is the horizontal synchronizing signal.

6. The special effect generator according to claim 1 wherein:

said at least one synchronizing signal is the vertical synchronizing frequency.

7. A special effects generator of the type utilized for simultaneously displaying at least two video signals in a predetermined pattern, said special effects generator including means for moving a portion of said pattern associated with one of said video displays with respect to the other, in combination therewith apparatus for preventing an undesired segment of said moved pattern from appearing at one edge of the simultaneous display when said moved pattern has a desired portion thereof positioned at an opposite edge, comprising:

a. controllable switching means responsive to said at least two video signals for selectively switching therebetween to provide any one of said video signals at an output terminal, when controlled by a suitable pattern signal applied to a control terminal associated with said switching means, b. a synchronizing generator for providing at least one synchronizing signal for said video signals to permit a stable raster display, c. positioner means responsive to said synchronizing signals for providing phase shifted synchronizing signals to enable the movement of said predetermined pattern, d. a pattern generator having an input responsive to said phase shifted synchronizing signal for providing at an output a series of pulses determined in accordance with said predetermined pattern, e. a first divider coupled to said positioner means for producing a first divided synchronizing signal therefrom with a phase in accordance with said phase shifted synchronizing signal, f. a second divider coupled to said synchronizing generator for producing a second divided synchronizing signal at a phase in accordance with said unshifted synchronizing signal, g. coincidence means responsive to said first and second divided signals and said series of pulses to provide a new series of pulses for application to said control terminal of said switching means to enable said switching means to provide a signal for generating a simultaneous display of said video signals, whereby only said desired portion of said pattern representative of said one signal appears at an edge of said display, when said pattern is moved.

8. The special effect generator according to claim 6 wherein:

a. said first and second dividers each comprise a binary multivibrator.

9. The special effects generator according to claim 6 wherein:

a. said synchronizing signal is the horizontal signal.

* * * * *

UNITED STATES PATENT OFFICE
CERTIFICATE OF CORRECTION

Patent No. 3,689,694 Dated September 5, 1972

Inventor(s) Laurence Joseph Thorpe

It is certified that error appears in the above-identified patent and that said Letters Patent are hereby corrected as shown below:

Column 1, line 6, cancel beginning with "There are many" to and including "another." in column 1, line 9. Column 4, line 56, the portion which reads, "The waveshape B.$\bar{C}$.$\bar{D}$. in FIG. 4I" should read --The waveshape B.C.D. and B.$\bar{C}$.$\bar{D}$. shown in FIG. 4I--.

Signed and sealed this 13th day of March 1973.

(SEAL)
Attest:

EDWARD M.FLETCHER,JR.
Attesting Officer

ROBERT GOTTSCHALK
Commissioner of Patents

FORM PO-1050 (10-69)
1530 6|72

USCOMM-DC 60376-P69
* U.S. GOVERNMENT PRINTING OFFICE 1969 O—366-334